United States Patent
Koo et al.

(10) Patent No.: US 10,230,092 B2
(45) Date of Patent: Mar. 12, 2019

(54) SECONDARY BATTERY AND ELECTRODE TERMINAL FOR THE SECONDARY BATTERY

(71) Applicant: SAMSUNG SDI CO., LTD., Yongin-si, Gyeonggi-do (KR)

(72) Inventors: Minseok Koo, Yongin-si (KR); Hyunyoung Lim, Yongin-si (KR); Hyunsoo Lee, Yongin-si (KR); Janghyun Song, Yongin-si (KR)

(73) Assignee: SAMSUNG SDI CO., LTD, Yongin-si, Gyeonggi-do (KR)

( * ) Notice: Subject to any disclaimer, the term of this patent is extended or adjusted under 35 U.S.C. 154(b) by 237 days.

(21) Appl. No.: 15/182,974

(22) Filed: Jun. 15, 2016

(65) Prior Publication Data
US 2017/0149044 A1    May 25, 2017

(30) Foreign Application Priority Data
Nov. 24, 2015 (KR) .................. 10-2015-0164899

(51) Int. Cl.
*H01M 2/30* (2006.01)
*H01M 2/06* (2006.01)

(52) U.S. Cl.
CPC .............. *H01M 2/30* (2013.01); *H01M 2/06* (2013.01); *H01M 2/305* (2013.01)

(58) Field of Classification Search
CPC .................................. H01M 2/30; H01M 2/06
See application file for complete search history.

(56) References Cited

U.S. PATENT DOCUMENTS

| | | | |
|---|---|---|---|
| 2011/0200870 A1* | 8/2011 | Kim | H01M 2/06 429/179 |
| 2011/0287291 A1 | 11/2011 | Byun et al. | |
| 2012/0094171 A1* | 4/2012 | Guen | H01M 2/06 429/179 |
| 2012/0148911 A1 | 6/2012 | Suzuki et al. | |
| 2012/0225348 A1 | 9/2012 | Kim | |
| 2012/0258339 A1 | 10/2012 | Kim | |
| 2013/0224536 A1* | 8/2013 | Hattori | H01M 2/30 429/61 |
| 2014/0212741 A1* | 7/2014 | Kim | H01M 2/06 429/179 |

FOREIGN PATENT DOCUMENTS

| | | |
|---|---|---|
| JP | 2009-252393 A | 10/2009 |
| KR | 10-2011-0128084 A | 11/2011 |
| KR | 10-2012-0089789 A | 8/2012 |
| KR | 10-2012-0100477 A | 9/2012 |
| KR | 10-2012-0115439 A | 10/2012 |

* cited by examiner

*Primary Examiner* — Maria Laios
(74) *Attorney, Agent, or Firm* — Lee & Morse P.C.

(57) ABSTRACT

Disclosed is a secondary battery that may include an electrode assembly; a case to accommodate the electrode assembly; a cap plate to seal the case; and at least one electrode terminal connected to the electrode assembly and passing through the cap plate, wherein the electrode terminal includes a terminal plate positioned on the cap plate and a terminal pin passing through the cap plate and the terminal plate, the terminal plate includes at least two rivet grooves having a predetermined depth from a top surface of the terminal plate, and the terminal pin includes at least two stepped portions protruding from a side surface of the terminal pin to correspond to the at least two rivet grooves.

11 Claims, 4 Drawing Sheets

SECONDARY BATTERY AND ELECTRODE TERMINAL FOR THE SECONDARY BATTERY

CROSS-REFERENCE TO RELATED APPLICATION

Korean Patent Application No. 10-2015-0164899, filed on Nov. 24, 2015, in the Korean Intellectual Property Office, and entitled: "Secondary Battery," is incorporated by reference herein in its entirety.

BACKGROUND

1. Field

Exemplary embodiments relate to a secondary battery.

2. Description of the Related Art

Generally, secondary batteries may be discharged and recharged, unlike primary batteries, which are not rechargeable. Secondary batteries may be of a low capacity type, which may include battery cells in the form of a pack typically used for small portable electronic devices such as cellular phones and camcorders, or a high capacity type, which may include battery cells used as a motor-driving power source and having several battery cells connected to one another as a power source for hybrid vehicles, etc.

Secondary batteries may be manufactured in various shapes, such as cylindrical shapes, prismatic shapes or pouch shapes. A typical secondary battery may be manufactured by accommodating an electrode assembly having a positive electrode plate and a negative electrode plate with a separator acting as an insulator between the positive and negative electrode plates in a case with an electrolyte, and installing a cap plate on the case. Here, positive and negative electrode terminals are coupled to the electrode assembly and are exposed and protruded to the outside through the cap plate.

SUMMARY

According to exemplary embodiments, there is provided a secondary battery that may include an electrode assembly; a case to accommodate the electrode assembly; a cap plate to seal the case; and at least one electrode terminal connected to the electrode assembly and passing through the cap plate, wherein the electrode terminal includes a terminal plate positioned on the cap plate and a terminal pin passing through the cap plate and the terminal plate, the terminal plate includes at least two rivet grooves having a predetermined depth from a top surface of the terminal plate, and the terminal pin includes at least two stepped portions protruding from a side surface of the terminal pin to correspond to the at least two rivet grooves.

The terminal plate may include a throughhole into which the terminal pin is inserted to pass therethrough; a first rivet groove of the at least two rivet grooves along the periphery of the throughhole and having a predetermined depth; and a second rivet groove of the at least two rivet grooves along the periphery of the throughhole and having a predetermined depth from a bottom surface of the first rivet groove.

The second rivet groove may have a larger diameter than the throughhole and a smaller diameter than the first rivet groove.

The terminal plate may further include a round portion at a region where the throughhole and a bottom surface of the terminal plate are connected to each other.

The terminal pin may include a first region inserted into the throughhole of the terminal plate and a second region passing through the cap plate.

The second region may have a larger diameter than the first region.

A top portion of the first region may include a first stepped portion of the at least two stepped portions extending from the first region and inserted into the first rivet groove, and a second stepped portion of the at least two stepped portions extending from the first region under the first stepped portion and inserted into the second rivet groove.

A top surface of the first stepped portion may be positioned to be coplanar with a top surface of the first region and a top surface of the terminal plate.

The first region may further include a round portion at a region where the first region and the second region are connected to each other.

The terminal pin and the terminal plate may be made of dissimilar metals.

According to exemplary embodiments, an electrode terminal for a secondary battery, may be provided in which the electrode terminal may be for connecting with an electrode assembly accommodated by a case and for passing through a cap plate for sealing the case, the electrode terminal may comprise: a terminal plate to be positioned on the cap plate and including at least two rivet grooves having a predetermined depth from a top surface of the terminal plate; and a terminal pin passing through the terminal plate and for passing through the cap plate, the terminal pin including at least two stepped portions protruding from a side surface of the terminal pin to correspond to the at least two rivet grooves.

BRIEF DESCRIPTION OF THE DRAWINGS

Features will become apparent to those of ordinary skill in the art by describing in detail exemplary embodiments with reference to the attached drawings in which.

DETAILED DESCRIPTION

Figure 1:
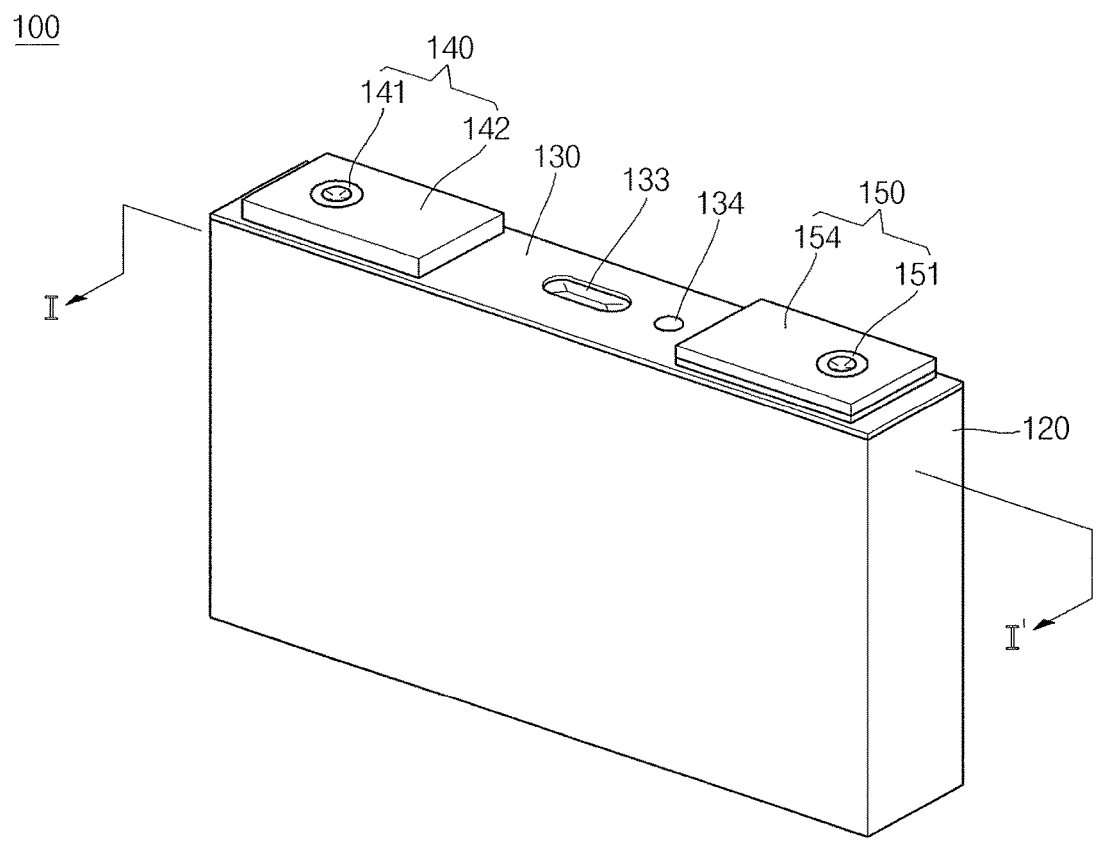
FIG. 1 illustrates a perspective view of a secondary battery according to an exemplary embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

As used herein, the term "and/or" may include any and all combinations of one or more of the associated listed items. It will also be understood that when an element is referred to as "bent," this expression does not limit the configuration to an element formed or shaped by a bending process, but includes any such angled, curved, or similarly shaped configuration created by any suitable process.

The terminology used herein is for the purpose of describing particular embodiments only and is not intended to limit the invention. As used herein, the singular forms are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various members, elements, regions, layers and/or sections, these members, elements, regions, layers and/or sections should not be limited by these terms. These terms are only used to distinguish one member, element, region, layer, and/or section from another. Thus, for example, a first member, a first element, a first region, a first layer, and/or a first section discussed below could be termed a second member, a second element, a second region, a second layer and/or a second section.

Figure 2:
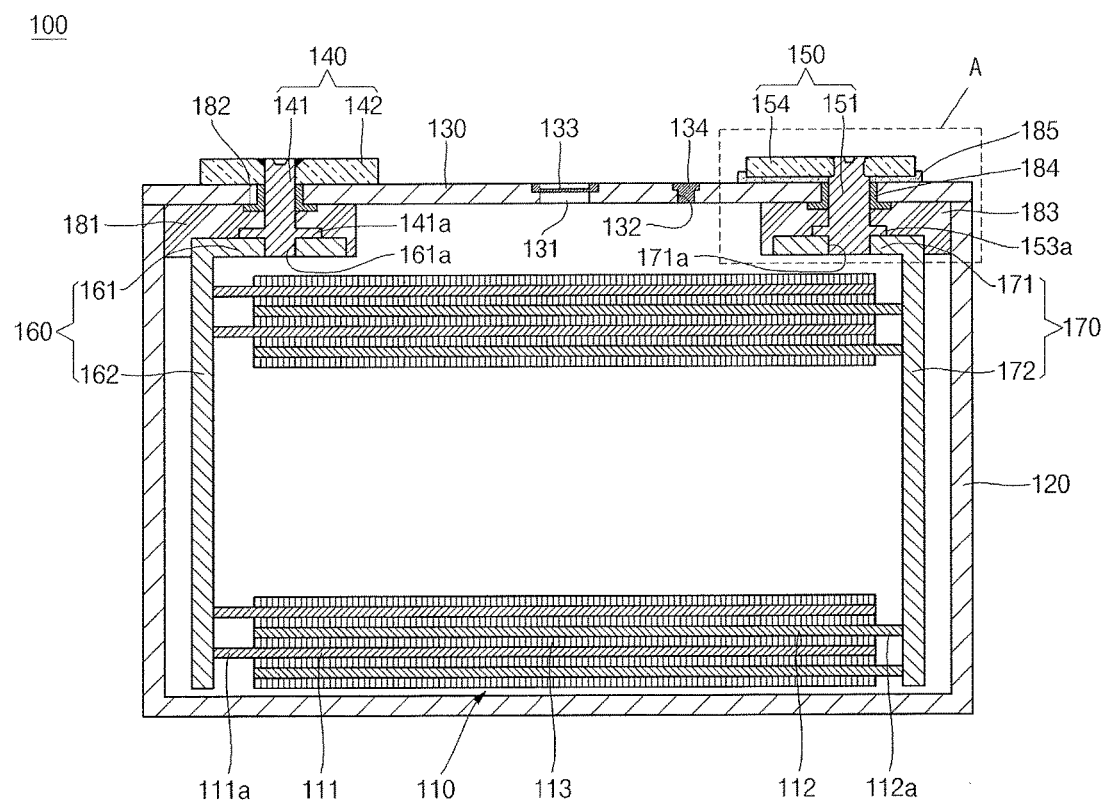
FIG. 2 illustrates a cross-sectional view of the secondary battery, taken along the line I-I' of FIG. 1.
Figure 3:
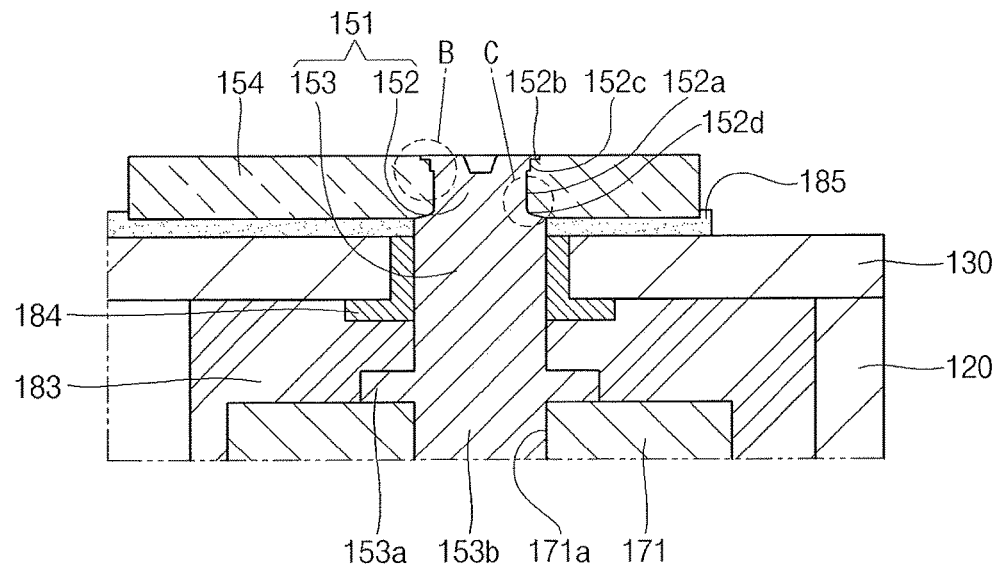
FIG. 3 illustrates an enlarged cross-sectional view illustrating a portion 'A' of FIG. 2.
Figure 4:
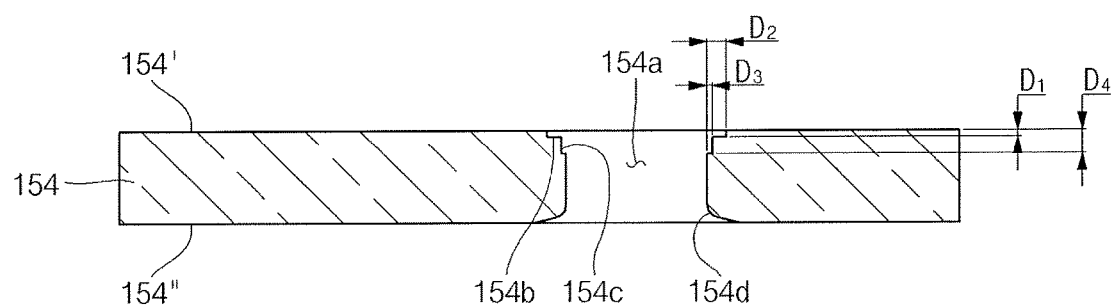
FIG. 4 illustrates a cross-sectional view illustrating a second terminal plate in the secondary battery shown in FIG. 1.

FIG. 1 is a perspective view of a secondary battery according to an exemplary embodiment, FIG. 2 is a cross-sectional view of the secondary battery, taken along the line I-I' of FIG. 1, FIG. 3 is an enlarged cross-sectional view illustrating a portion 'A' of FIG. 2, and FIG. 4 is a cross-sectional view illustrating a second terminal plate in the secondary battery shown in FIG. 1.

Referring to FIGS. 1 to 6, the secondary battery 100 according to an exemplary embodiment may include an electrode assembly 110, a case 120, a cap plate 130, a first electrode terminal 140, and a second electrode terminal 150. In addition, the secondary battery 100 may further include a first connection assembly 160, a second connection assembly 170, a first lower insulation member 181, a first gasket 182, a second lower insulation member 183, a second gasket 184, and an upper insulation member 185.

The electrode assembly 110 may be formed by winding or laminating a stacked structure of a first electrode plate 111, a separator 113 and a second electrode plate 112, which are thin plates or layers. Here, the first electrode plate 111 may serve as a positive electrode and the second electrode plate 112 may serve as a negative electrode, and vice versa.

The first electrode plate 111 may be formed by coating a first electrode active material, such as a transition metal oxide, for example, on a first electrode collector made of a metal foil, such as aluminum (Al) or an aluminum (Al) alloy foil, for example. The first electrode plate 111 may include a first electrode active material layer on which the first electrode active material is coated, and a first electrode uncoated portion 111a on which the first electrode active material is not coated. The first electrode uncoated portion 111a may function as a passage for current flowing between the first electrode plate 111 and an exterior of the first electrode plate 111. Exemplary embodiments do not limit the material of the first electrode plate 111 to those listed herein.

The second electrode plate 112 may be formed by coating a second electrode active material, such as graphite or carbon, for example, on a second electrode collector made of a metal foil, such as copper (Cu), a copper (Cu) alloy, nickel (Ni) or a nickel (Ni) foil, for example. The second electrode plate 112 may include a second electrode active material layer on which the second electrode active material is coated, and a second electrode uncoated portion 112a on which the second electrode active material is not coated. The second electrode uncoated portion 112a may function as a passage for current flowing between the second electrode plate 112 and an exterior of the second electrode plate 112. Exemplary embodiments do not limit the material of the second electrode plate 112 to those listed herein.

In other embodiments, polarities of the first and second electrode plates 111 and 112 may differ from what is described above. For example, the first electrode plate 111 may serve as a negative electrode, and the second electrode plate 112 may serve as a positive electrode.

The separator 113 may be positioned between the first electrode plate 111 and the second electrode plate 112 to prevent electrical short circuits and to allow movement of lithium ions. The separator 113 may be made of polyethylene, polypropylene, or a composite film of polypropylene and polyethylene, for example. Exemplary embodiments do not limit the material of the separator 113 to those listed herein.

The electrode assembly 110 may be accommodated in the case 120 together with an electrolyte. The electrolyte may include a mixture containing a lithium salt dissolved in an organic solvent, for example. In addition, the electrolyte may exist in a liquid, solid or gel phase.

The case 120 may be made of a conductive metal, such as aluminum, an aluminum alloy or nickel plated steel, for example. The case 120 may have an approximately hexahedron shape having an opening through which the electrode assembly 110, the first connection assembly 160 and the second connection assembly 170 may be inserted and placed. While the case 120 and the cap plate 130 assembled with each other are illustrated in FIG. 2, the opening may correspond to a substantially opened portion of an upper edge of the case 120. Inner surfaces of the case 120 and the cap plate 130 may be insulated from the electrode assembly 110, the first connection assembly 160, and the second connection assembly 170. Here, the case 120 and the cap plate 130 may have a polarity, for example, the case 120 and the cap plate 130 may function as a positive electrode.

The cap plate 130 may seal the opening of the case 120 and may be made of the same material as the case 120. Therefore, the cap plate 130 and the case 120 may have the same polarity.

A first terminal hole, a second terminal hole, a vent hole 131 and an electrolyte injection hole 132 may be formed in the cap plate 130. The first electrode terminal 140 passes through the first terminal hole. In more detail, a first terminal pin 141 of the first electrode terminal 140 may pass through the first terminal hole. In addition, the second electrode terminal 150 may pass through the second terminal hole. In more detail, a second terminal pin 151 of the second electrode terminal 150 may pass through the second terminal hole. A vent plate 133 may be installed in the vent hole 131. A notch may be formed in the vent plate 133 to be opened at a predetermined voltage of the case 120. The electrolyte injection hole 132 may be formed for injecting an electrolyte into the case 120 and may be sealed by a plug 134.

The first electrode terminal 140 may be electrically connected to the first electrode plate 111 and may include the first terminal pin 141 and a first terminal plate 142.

The first terminal pin 141 may have a substantially cylindrical shape. A central portion of the first terminal pin 141 may pass through the cap plate 130. In addition, a flange 141a may be formed at a bottom portion of the first terminal pin 141 to prevent the first terminal pin 141 from being dislodged from the cap plate 130. Further, a bottom end of the first terminal pin 141, corresponding to a lower portion of the flange 141a, may be coupled to the first connection assembly 160, which will later be described in more detail. A top portion of the terminal pin 141 may be inserted into and pass through a throughhole of the first terminal plate 142, and a top end of the first terminal pin 141 may be riveted to prevent the first terminal plate 142 from being dislodged from the cap plate 130. In addition, the first terminal pin 141 and the first terminal plate 142 may be coupled to each other by riveting the top end of the first terminal pin 141.

A throughhole through which the first terminal pin 141 passes through may be formed in the first terminal plate 142. In addition, the first terminal plate 142 may be disposed on the cap plate 130. The first terminal plate 142 may be coupled to the first terminal pin 141 by riveting the top end of the first terminal pin 141. Accordingly, the first terminal plate 142 may be firmly fixed to the first terminal pin 141 without being dislodged from the cap plate 130.

The exemplary embodiments do not limit materials of the first terminal pin 141 and the first terminal plate 142 to those listed herein, and any known metallic materials suitable for use in the positive electrode terminal may be employed.

The second electrode terminal 150 may be electrically connected to the second electrode plate 112 and may include a second terminal pin 151 and a second terminal plate 154.

The second terminal pin 151 may include at least two stepped portions and a round portion and may have a substantially cylindrical shape. In more detail, the second terminal pin 151 may include a first region 152 and a second region 153.

The first region 152 may be inserted into and pass through a throughhole 154a of the second terminal plate 154. In addition, a top end of the first region 152 may be riveted to prevent the second terminal plate 154 from being dislodged from the cap plate 130. Here, the top end of the first region 152 may include a first stepped portion 152b and a second stepped portion 152c, and a bottom end of the first region 152 may include a round portion 152d.

The first stepped portion 152b, the second stepped portion 152c and the round portion 152d may be formed by riveting the first region 152. In addition, a first rivet groove 154b, a second rivet groove 154c and a round portion 154d may be formed in the second terminal plate 154, which will later be described. For example, a first stepped portion 152b and a second stepped portion 152c corresponding to the first rivet groove 154b and the second rivet groove 154c may be formed at the top end of the first region 152 by riveting. In addition, another round portion 152d corresponding to the round portion 154d may be formed at a bottom end of the first region 152 by riveting. Accordingly, the top and bottom ends of the first region 152 may be inserted into and brought into close contact with the rivet grooves 154b and 154c and the round portion 154d of the second terminal plate 154, thereby achieving coupling of the second terminal pin 151 and the second terminal plate 154.

The first stepped portion 152b may protrude a predetermined length from a side surface 152a of the first region 152 toward the first rivet groove 154b. Here, a top surface of the first stepped portion 152b may be coplanar with a top surface of the first region 152. For example, the first stepped portion 152b may protrude from the side surface 152a of the first region 152 and may be ring shaped.

The second stepped portion 152c may protrude a predetermined length from the side surface 152a of the first region 152 toward the second rivet groove 154c. Here, the second stepped portion 152c is positioned under the first stepped portion 152b between the first stepped portion 152b and the round portion 152d. In addition, the second stepped portion 152c may have a smaller diameter than the first stepped portion 152b. For example, the second stepped portion 152c may protrude from the side surface 152a of the first region 152 and may be ring shaped.

The round portion 152d may be formed by rounding a region where the first region 152 and the second region 153 are connected to each other. The second terminal pin 151 and the second terminal plate 154 may be smoothly bonded with each other by the round portion 152d without cracks generated between the second terminal pin 151 and the second terminal plate 154.

The second region 153 may downwardly extend from the first region 152 and may have a larger diameter than the first region 152. Therefore, the second terminal pin 151 may have a diameter at a boundary portion between the first region 152 and the second region 153 by the round portion 152d that gradually increases toward the second region 153. The second region 153 may pass through the cap plate 130 and have a flange 153a formed at its bottom portion to prevent the second terminal pin 151 from being dislodged from the cap plate 130. In addition, a bottom end 153b of the second terminal pin 151, corresponding to a lower portion of the flange 153a, may be coupled to the second connection assembly 170, which will later be described in more detail.

The second terminal plate 154 may be disposed on the cap plate 130 to be coupled to the second terminal pin 151. In detail, the first region 152 of the second terminal pin 151 may be riveted to the second terminal plate 154, thereby firmly fixing the second terminal pin 151 to the second terminal plate 154 without being dislodged from the cap plate 130. Referring to FIG. 4, the second terminal plate 154 may include a throughhole 154a, a first rivet groove 154b, a second rivet groove 154c, and a round portion 154d.

The throughhole 154a may be formed at one side of the second terminal plate 154 and may pass through the second terminal plate 154 from its top surface 154' to its bottom surface 154". As described above, the first region 152 of the second terminal pin 151 may be inserted into and pass through the throughhole 154a.

The first rivet groove 154b may have a predetermined depth D1 from the top surface 154' of the second terminal plate 154. The first rivet groove 154b may be formed to have a predetermined depth D2 along the periphery of the throughhole 154a. Here, the first rivet groove 154b may have a larger diameter than the throughhole 154a. In addition, the first rivet groove 154b and the throughhole 154a may be formed to be connected to each other.

The second rivet groove 154c may have a predetermined depth D3 along the periphery of the throughhole 154a. The second rivet groove 154c may have a predetermined depth D4 from the top surface 154' of the second terminal plate 154 and extend from a bottom surface of the first rivet groove 154b in a region adjacent to the throughhole 154a. Here, the second rivet groove 154c may have a larger diameter than the throughhole 154a and a smaller diameter than the first rivet groove 154b.

The round portion 154d may be formed on the bottom surface 154" of the second terminal plate 154. In more detail, the round portion 154d may be formed by rounding or flaring a region where the throughhole 154a meets the bottom surface 154" of the second terminal plate 154. The round portion 154d may prevent the second terminal plate 154 and the second terminal pin 151 from cracking due to impacts applied when the second terminal pin 151 may be riveted to the second terminal plate 154.

The first region 152 of the second terminal pin 151 may be inserted into the throughhole 154a of the second terminal plate 154. As indicated by a portion B shown in FIG. 3, the first stepped portion 152b and the second stepped portion 152c of the first region 152 may be inserted into the first rivet groove 154b and the second rivet groove 154c of the second terminal plate 154. Accordingly, upper regions of the second terminal pin 151 and the second terminal plate 154 may be firmly coupled to each other. In addition, as indicated by a portion C shown in FIG. 3, the round portion 152d of the first region 152, corresponding to the round portion 154d of the second terminal plate 154, may be firmly coupled to the round portion 154d of the second terminal plate 154. Therefore, the second terminal pin 151 and the second terminal plate 154 may be brought into close contact with each other on and under a region where they may be coupled to each other, thereby preventing the second terminal pin 151 and the second terminal plate 154 from being separated from each other or from being deformed.

The second terminal pin 151 may be made of a metal, such as copper, for example, and the second terminal plate 154 may be made of a metal, such as aluminum, for example. For example, the second terminal pin 151 and the second terminal plate 154 may be different materials from each other, for example, dissimilar metals. However, according to exemplary embodiments, the first and second rivet grooves 154b and 154c of the second terminal plate 154 may be firmly bonded with the first and second stepped portions 152b and 152c of the first region 152 at upper portions of the second terminal pin 151 and the second terminal plate 154, and the round portion 152d of the first region 152 may be firmly bonded with the round portion 154d of the second terminal plate 154 at lower portions of the second terminal pin 151 and the second terminal plate 154, thereby improving a coupling force between the second terminal pin 151 and the second terminal plate 154. In addition, as the coupling force between the second terminal pin 151 and the second terminal plate 154 is improved, strain (deformation) of the second electrode terminal 150 may be minimized. For example, even if the second terminal pin 151 and the second terminal plate 154 are made of dissimilar metals having different coefficients of thermal expansion such that they have different strains, they are tightly engaged with each other to be fixed to each other, thereby minimizing the overall strain by suppressing expansion.

The first connection assembly 160 may electrically connect the first electrode terminal 140 to the first electrode plate 111 of the electrode assembly 110. The first connection assembly 160 may include a first connection part 161 and a second connection part 162.

A first coupling hole 161a may be formed in the first connection part 161. A bottom end of the first terminal pin 141 may be riveted to the first coupling hole 161a. Accordingly, the first connection part 161 and the first terminal pin 141 may be electrically connected to each other.

The second connection part 162 may be bent from one end of the first connection part 161 in a substantially vertical direction to be extended. The second connection part 162 may be welded to the first electrode uncoated portion 111a to be electrically connected to the first electrode plate 111.

The second connection assembly 170 may electrically connect the second electrode terminal 150 to the second electrode plate 112 of the electrode assembly 110. The second connection assembly 170 may include a first connection part 171 and a second connection part 172.

A second coupling hole 171a may be formed in the first connection part 171. A bottom end of the second terminal pin 151 may be riveted to the second coupling hole 171a. Accordingly, the first connection part 171 and the second terminal pin 151 may be electrically connected to each other.

The second connection part 172 may be bent from one end of the first connection part 171 in a substantially vertical direction to be extended. The second connection part 172 may be welded to the second electrode uncoated portion 112a to be electrically connected to the second electrode plate 112.

The first lower insulation member 181 may be formed between the first connection assembly 160 and each of the cap plate 130 and the case 120 and may prevent unnecessary electrical short circuits therebetween.

The first gasket 182 may be interposed between the first terminal pin 141 and the cap plate 130. The first gasket 182 may seal the first terminal hole of the cap plate 130, through which the first terminal pin 141 passes.

The second lower insulation member 183 may be formed between the second connection assembly 170 and each of the cap plate 130 and the case 120 and may prevent unnecessary electrical short circuits therebetween.

The second gasket 184 may be interposed between the second terminal pin 151 and the cap plate 130. The second gasket 184 may seal the second terminal hole of the cap plate 130, through which the second terminal pin 151 passes.

The upper insulation member 185 may be interposed between the cap plate 130 and the second terminal plate 154. The cap plate 130 and the second terminal plate 154 may be electrically insulated from each other by the upper insulation member 185.

An upper insulation member may also be formed between the cap plate 130 and the first terminal plate 142.

Figure 5:
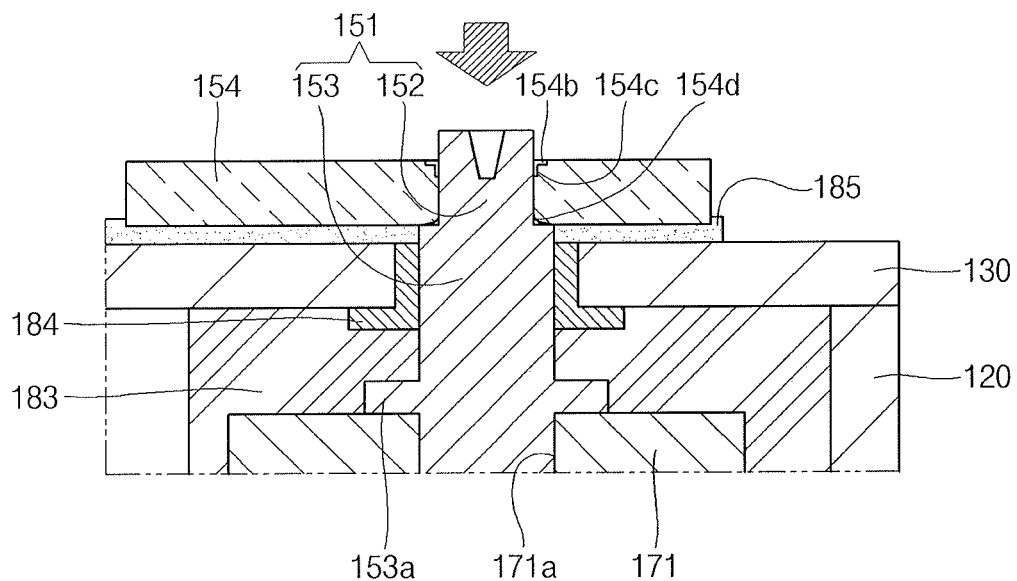
FIGS. 5 and 6 illustrate views illustrating a coupling mechanism between a second terminal pin and a second terminal plate in the secondary battery shown in FIG. 1.
Figure 6:
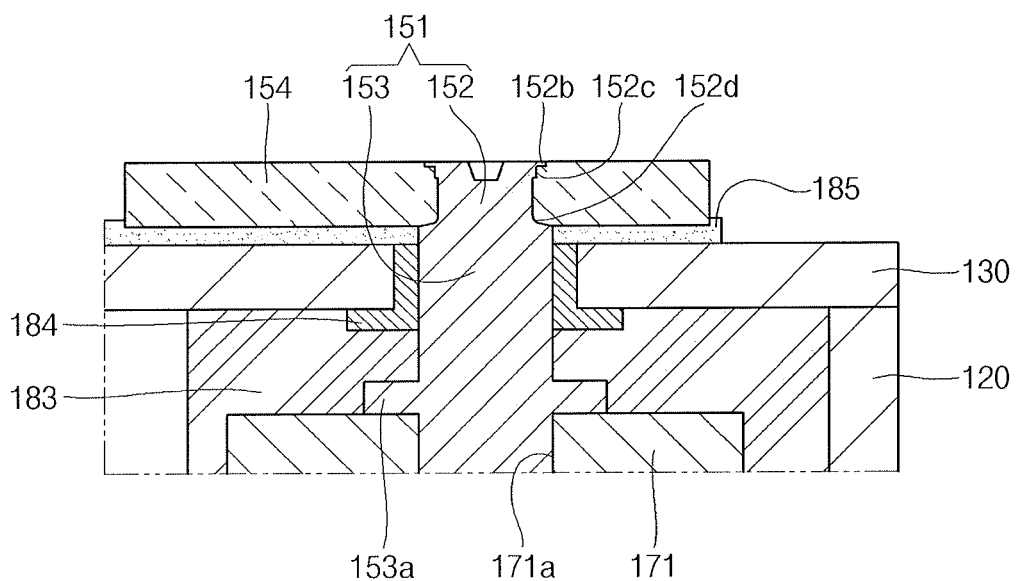

FIGS. 5 and 6 are views illustrating a coupling mechanism between a second terminal pin and a second terminal plate in the secondary battery shown in FIG. 1.

Referring to FIG. 5, the first region 152 of the second terminal pin 151 may be inserted into the throughhole 154a of the second terminal plate 154 having the first rivet groove 154b, the second rivet groove 154c and the round portion 154d. Here, regions corresponding to the first rivet groove 154b, the second rivet groove 154c and the round portion 154d may be an empty space and may be spaced apart from the first region 152.

A top portion of the first region 152 may be riveted, thereby bonding the second terminal pin 151 and the second terminal plate 154, as shown in FIG. 6. As a result of the riveting, the upper region of the first region 152 may be inserted into the first rivet groove 154b and the second rivet groove 154c. For example, the first region 152 may be inserted into the first rivet groove 154b and the second rivet groove 154c, so that the first stepped portion 152b and the second stepped portion 152c may be formed. In addition, the round portion 152d corresponding to the round portion 154d of the terminal plate 154 may be formed at the boundary portion between the first region 152 and the second region 153. The round portions 154d and 152d may be brought into close contact with each other. Here, lower regions where the second terminal plate 154 and the first region 152 may be brought into contact with each other may be formed as the round portions 154d and 152d, respectively, thereby smoothly bonding the second terminal plate 154 and the first region 152 to each other without cracks during the riveting.

As described above, in the secondary battery according to exemplary embodiments, the first stepped portion 152b and the second stepped portion 152c of the second terminal pin 151 may be bent and protruded by riveting to be inserted into the first and second rivet grooves 154b and 154c of the second terminal plate 154, thereby firmly bonding the second terminal pin 151 and the second terminal plate 154. In addition, the round portion 152d of the second terminal pin 151 may be firmly bonded with the round portion 154d of the second terminal plate 154 by riveting. Therefore, welding between the second terminal pin 151 and the second terminal plate 154, which may be formed using different metals, may be omitted, while improving a coupling force between the second terminal pin 151 and the second terminal plate 154. In addition, the overall strain of the second electrode terminal 150 may be suppressed by the improved coupling force between the second terminal pin 151 and the second terminal plate 154.

By way of summation and review, exemplary embodiments provide a secondary battery, which may improve reliability of electrode terminals including bonded dissimilar metals, while simplifying a manufacturing process and reducing the manufacturing cost.

As described above, the secondary battery according to exemplary embodiments may improve reliability of electrode terminals including bonded dissimilar metals, while simplifying a manufacturing process and reducing the manufacturing cost.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A secondary battery comprising:
   an electrode assembly;
   a case to accommodate the electrode assembly;
   a cap plate to seal the case; and
   at least one electrode terminal connected to the electrode assembly and passing through the cap plate, the electrode terminal including a terminal plate positioned on the cap plate and a terminal pin passing through the cap plate and the terminal plate, wherein:
   the terminal plate of the electrode terminal includes at least two rivet grooves having a predetermined depth from a top surface of the terminal plate, and
   the terminal pin of the electrode terminal includes:
      at least two stepped portions protruding from a side surface of the terminal pin to correspond to the at least two rivet grooves, and
      a round portion on a bottom surface of the terminal plate.

2. The secondary battery as claimed in claim 1, wherein the terminal plate includes:
   a throughhole into which the terminal pin is inserted to pass therethrough;
   a first rivet groove of the at least two rivet grooves along a periphery of the throughhole and having a predetermined depth; and
   a second rivet groove of the at least two rivet grooves along the periphery of the throughhole and having a predetermined depth from a bottom surface of the first rivet groove.

3. The secondary battery as claimed in claim 2, wherein the second rivet groove has a larger diameter than the throughhole and a smaller diameter than the first rivet groove.

4. The secondary battery as claimed in claim 2, wherein the terminal plate further includes a round portion at a region where the throughhole and a bottom surface of the terminal plate are connected to each other, the round portion of the terminal plate corresponding to the round portion of the terminal pin, and wherein
   the terminal plate and the terminal pin are electrically connected to each other through the round portion of the terminal plate and the round portion of the terminal pin.

5. The secondary battery as claimed in claim 2, wherein the terminal pin includes a first region inserted into the throughhole of the terminal plate and a second region passing through the cap plate.

6. The secondary battery as claimed in claim 5, wherein the second region has a larger diameter than the first region.

7. The secondary battery as claimed in claim 5, wherein a top portion of the first region includes a first stepped portion of the at least two stepped portions extending from the first region and inserted into the first rivet groove, and a second stepped portion of the at least two stepped portions extending from the first region under the first stepped portion and inserted into the second rivet groove.

8. The secondary battery as claimed in claim 7, wherein a top surface of the first stepped portion is positioned to be coplanar with a top surface of the first region and a top surface of the terminal plate.

9. The secondary battery as claimed in claim 5, wherein the first region further includes the round portion at a region where the first region and the second region are connected to each other.

10. The secondary battery as claimed in claim 1, wherein the terminal pin and the terminal plate are made of dissimilar metals.

11. The secondary battery as claimed in claim 1, wherein a portion of the terminal plate is between the at least two stepped portions of the terminal pin and the round portion of the terminal pin.

* * * * *